United States Patent
Li et al.

(10) Patent No.: US 10,160,693 B2
(45) Date of Patent: Dec. 25, 2018

(54) PROCESSING APPARATUS FOR QUICK RESOURCE RECOVERY OF KITCHEN GARBAGE

(71) Applicant: Chinese Research Academy of Environmental Sciences, Beijing (CN)

(72) Inventors: Mingxiao Li, Beijing (CN); Jiaqi Hou, Beijing (CN); Beidou Xi, Beijing (CN); Yan Hao, Beijing (CN); Chaowei Zhu, Beijing (CN); Yonghai Jiang, Beijing (CN); Xuan Jia, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 308 days.

(21) Appl. No.: 14/895,603

(22) PCT Filed: Apr. 1, 2015

(86) PCT No.: PCT/CN2015/075646
§ 371 (c)(1),
(2) Date: Dec. 3, 2015

(87) PCT Pub. No.: WO2016/041335
PCT Pub. Date: Mar. 24, 2016

(65) Prior Publication Data
US 2016/0297721 A1  Oct. 13, 2016

(30) Foreign Application Priority Data
Sep. 16, 2014 (CN) ............ 2014 1 0471741

(51) Int. Cl.
C05F 9/02 (2006.01)
C05F 17/02 (2006.01)

(52) U.S. Cl.
CPC ............ *C05F 9/02* (2013.01); *C05F 17/0241* (2013.01); *Y02P 20/145* (2015.11); *Y02W 30/43* (2015.05)

(58) Field of Classification Search
CPC ..... C05F 9/02; C05F 17/0247; C05F 17/0205
See application file for complete search history.

(56) References Cited

U.S. PATENT DOCUMENTS 2,784,951 A * 3/1957 Bakewell ................. A22C 5/00
366/296
4,203,755 A * 5/1980 Ruckstuhl ........... C05F 17/0247
422/164

(Continued)

FOREIGN PATENT DOCUMENTS

CN  1799715  7/2006
CN  2873340  2/2007

(Continued)

OTHER PUBLICATIONS

Chinese Office Action issued in the corresponding Chinese Application No. 201410471741.8, dated Dec. 24, 2015, 10 pages.

*Primary Examiner* — William H. Beisner
(74) *Attorney, Agent, or Firm* — Hamre, Schumann, Mueller & Larson, P.C.

(57) ABSTRACT

Provided is a processing apparatus for quick resource recovery of kitchen garbage, configured as a fully enclosed silo and comprising: a transportation chain configured to drive a charger to lift up and down with a feed port correspondingly disposed above the transportation chain, shredder blades being provided within the feed port to shred materials; a fermentation chamber below the shredder blades, a main stirring shaft being horizontally provided within the fermentation chamber, two secondary stirring wheels being provided on the main stirring shaft at two respective side walls of the fermentation chamber, at the respective side walls the main stirring shaft is connected onto the fermentation cham- (Continued)

ber the main stirring shaft configured to be rotated in a direction opposite to that of the secondary stirring wheels; the main stirring shaft being provided with stirring paddles; a spiral discharger horizontally provided below the main stirring shaft and provided with a discharge port at one end thereof; a deodorant chamber provided at one side of the feed port, four layers of spaces for placing deodorant fillers therein being arranged within the deodorant chamber, the four layers of deodorant fillers comprising activated carbons, a molecular sieve, a mixture of compost product as well as fungal chaff and lees, and a mixture of wood cuttings and straws in an up-to-down order; the deodorant chamber being provided with an air inlet at its bottom and with an air outlet and a monitor at its top.

6 Claims, 1 Drawing Sheet

(56) References Cited

U.S. PATENT DOCUMENTS

| | | | | |
|---|---|---|---|---|
| 5,687,918 | A * | 11/1997 | Kubota | C05F 17/0072 241/23 |
| 6,200,475 | B1 * | 3/2001 | Chen | B09B 3/00 210/613 |
| 2007/0048852 | A1 * | 3/2007 | Holker | C12M 21/04 435/186 |
| 2013/0260446 | A1 * | 10/2013 | Berberet | C05F 17/0247 435/286.6 |
| 2017/0226466 | A1 * | 8/2017 | Grillo | C12M 45/20 |

FOREIGN PATENT DOCUMENTS

| | | |
|---|---|---|
| CN | 101913925 | 12/2010 |
| CN | 201952372 | 8/2011 |
| CN | 202270696 | 6/2012 |
| CN | 102786363 | 11/2012 |
| CN | 103464452 | 12/2013 |
| CN | 103480633 | 1/2014 |
| CN | 104230400 | 12/2014 |
| KR | 20020035362 | 5/2002 |
| KR | 20140054732 | 5/2014 |
| WO | 2005099920 | 10/2005 |
| WO | 2013149359 | 10/2013 |

* cited by examiner

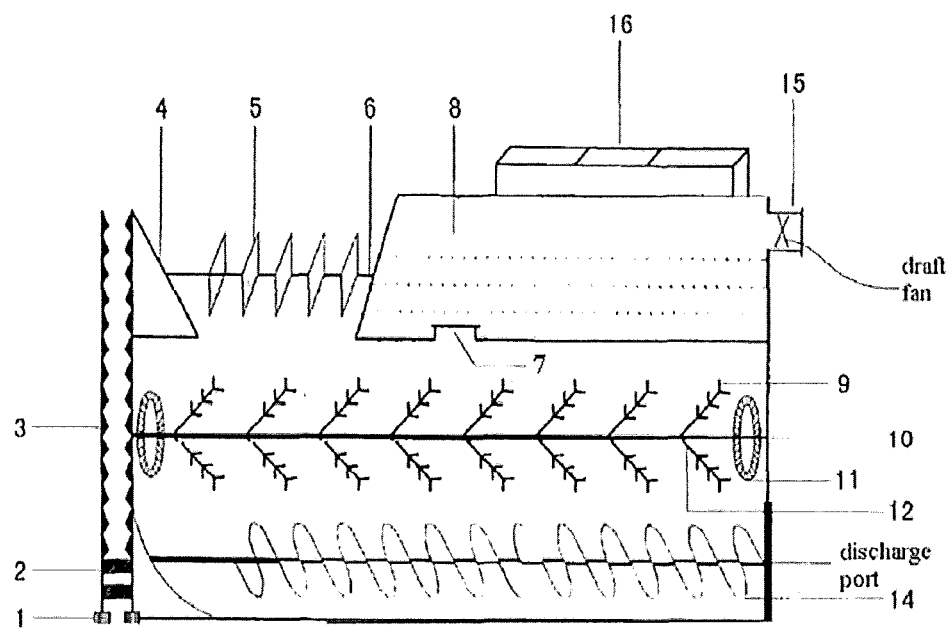

PROCESSING APPARATUS FOR QUICK RESOURCE RECOVERY OF KITCHEN GARBAGE

BACKGROUND OF THE INVENTION

1. Field of the Invention

The present disclosure relates to the field of domestic garbage treatment, and particularly, to a processing apparatus for quick resource recovery of kitchen garbage.

2. Description of the Related Art

Kitchen garbage is of waste generated during residents' living consumption, mainly comprising tailings and food residues from households, dining halls of enterprises and institutions, the catering service industry and the like, and are characterized in large quantity, wide range, complex components, high saltiness, high proneness to putridness and metamorphism, while being easy to breed bacteria and being accompanied by stench. Currently, mixed collection and transportation of kitchen garbage increases difficulty in processing the kitchen garbage, which results in that components of renewable resources such as organic components could not be effectively utilized, while mixture of toxic and harmful substances in the kitchen garbage impedes subsequent separation operation. The kitchen garbage, which are collected and transported in a mixed way, if not being specially processed, will pose a great threat to water, air, soil and even human health, which is a key environmental issue to be solved urgently in social development.

At present, prior art kitchen garbage processing equipments have a number of disadvantages such as poor stirring effect, "burnt material" due to uneven heating, poor fermentation effect of a large piece of kitchen garbage and the like. These equipments are higher in cost, lower in efficiency and poor processing effect when being used to process the kitchen garbage.

SUMMARY OF THE INVENTION

An object of the present disclosure is to provide a processing apparatus for quick resource recovery of kitchen garbage, in order to overcome the disadvantages and defects in prior arts.

In order to achieve the above object, the present disclosure provides a processing apparatus for quick resource recovery of kitchen garbage, configured as a fully enclosed silo and comprising:

a transportation chain configured to drive a charger to lift up and down with a feed port correspondingly disposed above the transportation chain, shredder blades being provided within the feed port to shred materials;

a fermentation chamber below the shredder blades, a main stirring shaft being horizontally provided within the fermentation chamber, two secondary stirring wheels being provided on the main stirring shaft at two respective side walls of the fermentation chamber, at the respective side walls the main stirring shaft is connected onto the fermentation chamber, so as to avoid the materials from being burnt due to over high heating temperature, the main stirring shaft being configured to be rotated in a direction opposite to that of the secondary stirring wheels; the main stirring shaft being provided with stirring paddles;

a spiral discharger horizontally provided below the main stirring shaft and provided with a discharge port at one end thereof;

a deodorant chamber provided at one side of the feed port, four layers of spaces for placing deodorant fillers therein being arranged within the deodorant chamber, the four layers of deodorant fillers comprising activated carbons, a molecular sieve, a mixture of compost product as well as fungal chaff and lees, and a mixture of wood cuttings and straws in an up-to-down order; the deodorant chamber being provided with an air inlet at its bottom and with an air outlet and a monitor at its top.

In the processing apparatus for quick resource recovery of kitchen garbage, lift motion of the transportation chain is controlled by the monitor, the feed port is closed after feeding the materials, and the shredder blades are driven by a motor which is controlled by the monitor.

In the processing apparatus for quick resource recovery of kitchen garbage, the shredder blades are provided with spraying holes for automatic cleaning to avoid blockage.

In the processing apparatus for quick resource recovery of kitchen garbage, a heating plate is provided on a side wall of the fermentation chamber, and the monitor is configured to startup and stop heating operation of the heating plate; and a sprayer is provided within the fermentation chamber with spraying holes disposed to be inclined downward at an angle of 30°~60° with respect to a vertical plane, and the monitor is configured to startup and stop spraying operation of the sprayer The processing apparatus for quick resource recovery of kitchen garbage, a height of each of respective layers of fillers occupy ⅔ of the corresponding one of respective layers of spaces within the deodorant chamber; and wherein the compost product, the fungal chaff and the lees are mixed in a volume ratio of 3~4:1~2:1~2.

In the processing apparatus for quick resource recovery of kitchen garbage, a sprayer is provided within the deodorant chamber and is controlled by the monitor to spray deodorant.

In the processing apparatus for quick resource recovery of kitchen garbage, a draft fan is provided at the air outlet of the deodorant chamber for drawing off air.

In the processing apparatus for quick resource recovery of kitchen garbage, the stirring paddles are provided with stirring blades.

In the processing apparatus for quick resource recovery of kitchen garbage, materials within the fermentation chamber are pushed and transported to the discharge port by the spiral discharger.

In the processing apparatus for quick resource recovery of kitchen garbage, a real-time weighing device is provided at a bottom of the fully enclosed silo, for obtaining information about degradation of the materials.

The present disclosure provides the following advantages:

1. In the present disclosure, a fully enclosed integrated design is applied, where sprayers are provided at various stages for facilitating cleaning at various stages, while ensuring effectiveness of fermentation and deodorization.

2. In the present disclosure, the deodorant chamber is consisted of multistage filter layers, which are sprayed at regular time, thereby ensuring deodorization effect.

3. In the present disclosure, the shredder is provided with an emergency brake function so as to ensure simultaneous feeding and shredding operation and to ensure safety.

4. In the present disclosure, one main stirring shaft and two secondary stirring wheels are arranged within the fermentation chamber, in order to avoid rotation blockage or breakage of a single bearing due to over large force, while avoiding proneness to "burnt material" near the main stirring shaft during heating in practice application.

5. A real-time weighing device is provided at a bottom of the kitchen garbage treatment integrated apparatus, for obtaining information about degradation of the materials in time.

6. In the present disclosure, necessary parameters of the whole integrated apparatus are controlled and monitored by an automatic monitoring system with simple operations.

7. The present disclosure is provided with convenient maintenance, simple, safe and reliable installation and operation, and better processing effect.

BRIEF DESCRIPTION OF THE DRAWINGS

FIG. 1 is structural schematic diagram of a processing apparatus for quick resource recovery of kitchen garbage according to the present disclosure.

DESCRIPTION OF REFERENCE NUMBERS FOR MAIN COMPONENTS IN THE FIGURE 1 base, 2 charger, 3 transportation chain, 4 feed port, 5 shredder blade, 6 shredding shaft, 7 air inlet, 8 deodorant chamber, 9 stirring blade, 10 main stirring shaft, 11 secondary stirring wheel, 12 stirring paddle, 13 discharge port, 14 spiral discharger, 15 air outlet, 16 monitor.

DETAINED DESCRIPTION OF PREFERRED EMBODIMENTS OF THE INVENTION

With reference to FIG. 1, a processing apparatus for quick resource recovery of kitchen garbage according to the present disclosure is configured as a fully enclosed silo in order to ensure safe operations of the shredder and the like, is provided with automatic feeding function, fermentation function, deodorization function and shredding function, and meanwhile is equipped with a programmable automatic monitoring system.

The automatic feeding function of the present disclosure is provided by an automatic feeder comprising a conveyer and a charger. The conveyer is fixed on a base 1, and drives a transportation chain 3 to lift along a slide rail through a deceleration motor. The charger 2 (which may be a material barrel in this embodiment) is provided on the transportation chain 3 of the conveyer. The automatic feeding function is controlled by a monitor 16.

The processing apparatus for quick resource recovery of kitchen garbage according to the present disclosure is provided with a feed port 4 at its top, which is closed after the charger 2 finishes feeding of materials. A shredding shaft 6 is arranged within the feed port 4, and shredder blades 5 are fixed on the shredding shaft 6 to shred materials. The shredding shaft 6 is driven directly by a motor, is controlled by the monitor 16 to start up or stop, and is provided with a emergency brake function so as to ensure simultaneous feeding and shredding operation. The shredder blades 5 are provided with automatic cleaning spraying holes, for cleaning the shredder after running a period, thereby preventing blockage.

A deodorant chamber 8 is provided at one side of the feed port 4, and four layers of partition plates with air holes are provided within the deodorant chamber so that four layers of deodorant fillers are formed within the deodorant chamber. The four layers of deodorant fillers comprises 1) activated carbons, 2) a molecular sieve, 3) a mixture of compost product as well as fungal chaff and lees, and 4) a mixture of wood cuttings and straws in an up-to-down order. The compost product, the fungal chaff and the lees are mixed in a volume ratio of 3~4:1~2:1~2. Small-sized sprayers are provided within the deodorant chamber 8 and are controlled by the monitor to automatically spray deodorant. The deodorant chamber 8 is provided with an air inlet 7 at its bottom and with an air outlet 15 at its top above the filter layers, and a draft fan is provide at the air outlet for drawing off air. Materials shredded within the feed port 4 enter a fermentation chamber, within which a main stirring shaft 10 is horizontally provided, and preferably, is horizontally provided at a middle position within the fermentation chamber. The main stirring wheel 10 is provided with a number of stirring paddles 12 provided with stirring blades 9 at certain plane angles. An angle between the stirring paddle on the main stirring shaft and the main stirring shaft is preferably in a range of 15°~25°.

A spiral discharger 14 is also horizontally provided below the main stirring shaft 10 (that is, at lower portion of fermentation chamber) and provided with a discharge port at one end thereof corresponding to the fermentation chamber, and materials within the fermentation chamber are, after reaction, pushed by the spiral discharger 14 to discharge port. In the present disclosure, a heating plate is provided on a side wall of the fermentation chamber, and the monitor 16 is configured to startup and stop heating operation of the heating plate. A sprayer is further provided within the fermentation chamber with spraying holes disposed to be inclined downward at an angle of 30°~60° with respect to a vertical plane, and the monitor is configured to startup and stop spraying operation of the sprayer. In order to avoid rotation blockage or breakage of a single bearing due to over large force during actual operation of the processing apparatus for quick resource recovery of kitchen garbage, and meanwhile to further avoid proneness to "burnt material" near the main stirring shaft during heating in practice application, one secondary stirring wheel 11 is provided on each end of the main stirring shaft 10 at each of side walls of the fermentation chamber respectively, at the side walls of the fermentation chamber each end of the main stirring shaft 10 is connected onto the fermentation chamber, and an angle between a stirring paddle provided on the secondary stirring wheel 11 and a short moment bearing is preferably in a range of 15°~25°. The main stirring shaft 10 is configured to be rotated in a direction opposite to that of the two secondary stirring wheels 11.

The main stirring shaft 10 and the secondary stirring shafts 11 within the fermentation chamber are driven by motors, and rotation speeds of the main stirring shaft 10 and the secondary stirring shafts 11 and heating temperature of the heating plate are controlled by the monitor 16.

A real-time weighing device is provided at a bottom of the processing apparatus for quick resource recovery of kitchen garbage according to the present disclosure, for obtaining information about degradation of the materials. Reading is achieved in time through automatic monitoring.

What is claimed is:
1. A processing apparatus for resource recovery of kitchen garbage, configured as a fully enclosed silo and comprising:
a transportation chain configured to drive a charger to lift up and down with a feed port correspondingly disposed above the transportation chain, shredder blades being provided within the feed port to shred materials;
a fermentation chamber below the shredder blades, a main stirring shaft being horizontally provided within the fermentation chamber, two secondary stirring wheels being provided on the main stirring shaft at two respec- tive side walls of the fermentation chamber, at the respective side walls the main stirring shaft is connected onto the fermentation chamber, so as to avoid the materials from being burnt due to over high heating temperature, the main stirring shaft configured to be rotated in a direction opposite to that of the secondary stirring wheels; the main stirring shaft being provided with stirring paddles;

a spiral discharger horizontally provided below the main stirring shaft and provided with a discharge port at one end thereof;

a deodorant chamber provided at one side of the feed port, four layers of spaces which are filled respectively with four layers of deodorant fillers therein being arranged within the deodorant chamber, the four layers of deodorant fillers comprising activated carbons, a molecular sieve, a mixture of compost product as well as fungal chaff and lees, and a mixture of wood cuttings and straws in an up-to-down order; the deodorant chamber being provided with an air inlet at its bottom and with an air outlet and a monitor at its top.

2. The processing apparatus for resource recovery of kitchen garbage according to claim 1, wherein lift motion of the transportation chain is controlled by the monitor, the feed port is configured to be closed after feeding of the materials is completed, and the shredder blades are driven by a motor which is controlled by the monitor.

3. The processing apparatus for resource recovery of kitchen garbage according to claim 1, wherein a height of each of respective layers of fillers occupy ⅔ of the corresponding one of respective layers of spaces within the deodorant chamber; and wherein the compost product, the fungal chaff and the lees are mixed in a volume ratio of 3-4:1-2:1-2.

4. The processing apparatus for resource recovery of kitchen garbage according to claim 1, wherein a draft fan is provided at the air outlet of the deodorant chamber for drawing off air.

5. The processing apparatus for resource recovery of kitchen garbage according to claim 1, wherein the stirring paddles are provided with stirring blades.

6. The processing apparatus for resource recovery of kitchen garbage according to claim 1, wherein materials within the fermentation chamber are pushed and transported to the discharge port by the spiral discharger.

* * * * *